(12) United States Patent
Poulsen

(10) Patent No.: US 10,881,087 B1
(45) Date of Patent: Jan. 5, 2021

(54) METHOD OF HARVESTING CRUSTACEANS

(71) Applicant: Kris Poulsen and Associates, LLC, Shoreline, WA (US)

(72) Inventor: Edward Poulsen, Shoreline, WA (US)

(73) Assignee: KRIS POULSEN AND ASSOCIATES, LLC, Shoreline, WA (US)

( * ) Notice: Subject to any disclaimer, the term of this patent is extended or adjusted under 35 U.S.C. 154(b) by 290 days.

(21) Appl. No.: 16/057,030

(22) Filed: Aug. 7, 2018

Related U.S. Application Data

(60) Provisional application No. 62/542,272, filed on Aug. 7, 2017.

(51) Int. Cl.

| | |
|---|---|
| *A01K 69/08* | (2006.01) |
| *A01K 69/00* | (2006.01) |
| *A01K 69/06* | (2006.01) |
| *A01K 79/00* | (2006.01) |
| *A01K 85/01* | (2006.01) |
| *A01K 97/02* | (2006.01) |
| *A01K 99/00* | (2006.01) |

(52) U.S. Cl.
CPC .............. *A01K 69/08* (2013.01); *A01K 69/00* (2013.01); *A01K 69/06* (2013.01); *A01K 79/00* (2013.01); *A01K 85/01* (2013.01); *A01K 97/02* (2013.01); *A01K 99/00* (2013.01)

(58) Field of Classification Search
CPC ........ A01K 69/00; A01K 69/06; A01K 69/08; A01K 69/10; A01K 79/00; A01K 85/01; A01K 97/02; A01K 99/00

USPC ............................... 43/4, 4.5, 17.5, 100, 105
See application file for complete search history.

(56) References Cited

U.S. PATENT DOCUMENTS

| | | | |
|---|---|---|---|
| 5,782,033 A | 7/1998 | Park | |
| 8,553,501 B1 | 10/2013 | Cota | |
| 8,919,034 B2 | 12/2014 | Alhuwaishel | |
| 9,091,550 B1 | 7/2015 | Smith | |
| 9,814,226 B2 * | 11/2017 | Opshaug | .............. A01K 97/125 |
| 10,111,411 B2 * | 10/2018 | Garland | .............. A61B 5/0075 |
| 2003/0061978 A1 | 4/2003 | Myers | |

(Continued)

FOREIGN PATENT DOCUMENTS

| | | |
|---|---|---|
| CN | 104304199 A | 1/2015 |
| CN | 201520428619 | 11/2015 |

*Primary Examiner* — Darren W Ark
*Assistant Examiner* — Steven J Shur
(74) *Attorney, Agent, or Firm* — Timothy E. Siegel Patent Law, PLLC; Timothy E. Siegel

(57) ABSTRACT

A method of harvesting crustaceans that utilizes a trap and buoy system, each trap being equipped with a digital camera and a light flash mechanism and being electrically connected to a buoy which has a wireless broadcast system to forward images received from the camera wirelessly to a further location that is equipped to receive the wirelessly transmitted image and to display the image to a human user. The method begins with laying out traps in the ocean, in a grid having a first grid spacing. Then for each trap, repeatedly lighting the trap with the flash mechanism and forming an image with the digital camera and sending the image to the further location. Then monitoring the images. Finally, in reliance on the images deciding to begin laying out traps in a grid, having a second grid spacing that is tighter than the first grid spacing, around a particular trap.

4 Claims, 1 Drawing Sheet

(56) References Cited

U.S. PATENT DOCUMENTS

| | | |
|---|---|---|
| 2008/0016749 A1 | 1/2008 | Preidnieks |
| 2013/0109259 A1 | 5/2013 | Abulrassoul et al. |
| 2013/0167428 A1 | 7/2013 | Alhuwaishel |
| 2015/0359205 A1 | 12/2015 | Garland |
| 2016/0309692 A1 | 10/2016 | Opshaug |

* cited by examiner

METHOD OF HARVESTING CRUSTACEANS

RELATED APPLICATIONS

This application claims benefit from provisional application U.S. Ser. No. 62/542,272 filed on Aug. 7, 2017, which is incorporated by referenced as if fully set forth herein.

BACKGROUND

Harvesting crustaceans is beset by many challenges. The typical technique, for crabs, is to lay out baited traps ("pots" for crab traps) in a loose grid of about 1 nautical mile between pots. This process can take a day, as the total route for laying out pots can be over 100 nautical miles. Then, the process of retrieving the pots begins, which is even more time consuming. As the pots are retrieved, difficult decisions must be made. For example, if a pot rich with crabs is found, the captain may decide to stop retrieving pots and begin laying pots out in a tighter grid, of about ⅛ nautical mile between pots, around the pot with multiple crabs inside, on the theory that a rich crab area has been found. This decision must be made, however, in ignorance of the catch in the not-yet-retrieved pots, one or more of which may have a crab harvest that is richer still. It is also made in ignorance of the length of time that has passed since the crabs inside were caught. If it has been more than a day, the school of crabs may have moved on.

Another problem encountered is that of harvesting crabs in an area where there is a mix of crab species, particularly when one or more of the species is protected. In some instances, crabs in a protected species may be brought to the surface, but then must be released back into the ocean. In the instance of the Blue King Crab, however, the fisheries managing authority in Alaska has forbidden that this species even be brought to the ocean surface, effectively shutting down harvesting in areas that are rich in other crab species, such as the Pribilof Islands Red Crab.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, the present invention may take the form of a method of harvesting crustaceans that utilizes a trap and buoy system, each trap being equipped with a digital camera and a light flash mechanism and being electrically connected to a buoy which has a wireless broadcast system to forward images received from the camera wirelessly to a further location that is equipped to receive the wirelessly transmitted image and to display the image to a human user. The method begins with laying out traps in the ocean, in a grid having a first grid spacing. Then for each trap, repeatedly lighting the trap with the flash mechanism and forming an image with the digital camera and sending the image to the further location. Then monitoring the images. Finally, in reliance on the images deciding to begin laying out traps in a grid, having a second grid spacing that is tighter than the first grid spacing, around a particular trap.

In addition to the exemplary aspects and embodiments described above, further aspects and embodiments will become apparent by reference to the drawings and by study of the following detailed descriptions.

DETAILED DESCRIPTION OF PREFERRED EMBODIMENTS

Exemplary embodiments are illustrated in referenced drawings. It is intended that the embodiments and figures disclosed herein are to be considered illustrative rather than restrictive.

In a first preferred method, a crab harvest system is provided that includes traps and buoys, with each trap electrically communicating to a buoy. In one embodiment, the trap and the buoy are connected with an electrical conductive wire, whereas in another the communicative link is a sonar link. Also, each trap includes a digital camera and a light flash mechanism and each buoy is equipped with a wireless broadcast mechanism, capable of forwarding digital images taken by the digital camera to a further location, typically on the boat that initially holds the traps. In one embodiment, the buoy forwards the image signal to the boat directly, whereas in another embodiment the further location is shore based and a shore based person evaluates the images and directs or advises the boat crew.

In the first preferred method, the traps are laid out in a grid having a first grid spacing of between one-half nautical mile and one and a half nautical miles. This process is continued until all of the traps are laid out, or an initial set of traps set to be laid out is all laid out, or until a decision is made to stop laying out the traps. After a trap is laid out, it begins to repeatedly light the trap with the light trap mechanism and send images to the buoy, which relays the images to a further location where they are examined by a person. In one embodiment, the images are formed periodically, on the order of one every hour, for each trap. In another embodiment, the person monitoring the images can command that an image be taken, and the images are taken (including the use of the flash) on command from this person. In a preferred embodiment, a computer program is used to evaluate the images, in one variant using artificial intelligence.

At any time, before or after the grid is completed, a decision may be made to lay down the traps in a grid having a second grid spacing, tighter than the first, in an area that has been found to be rich in crabs. In a preferred embodiment, the second grid spacing is between one tenth and one sixth of a nautical mile between traps. This decision may be made by a person viewing the images from the traps and may be made before the initial grid is entirely laid out. The human user may base his decision on recent information on crab harvesting in the area, so that if an unusually large number of crabs are found in the first ten traps laid out, that may cause a speedy reevaluation of plans, to lay traps in a tight grid, in this area. One advantage of making an early decision to lay traps in a tighter grid, is that there will be more traps still on board the vessel, when this decision is made.

Figure 1:
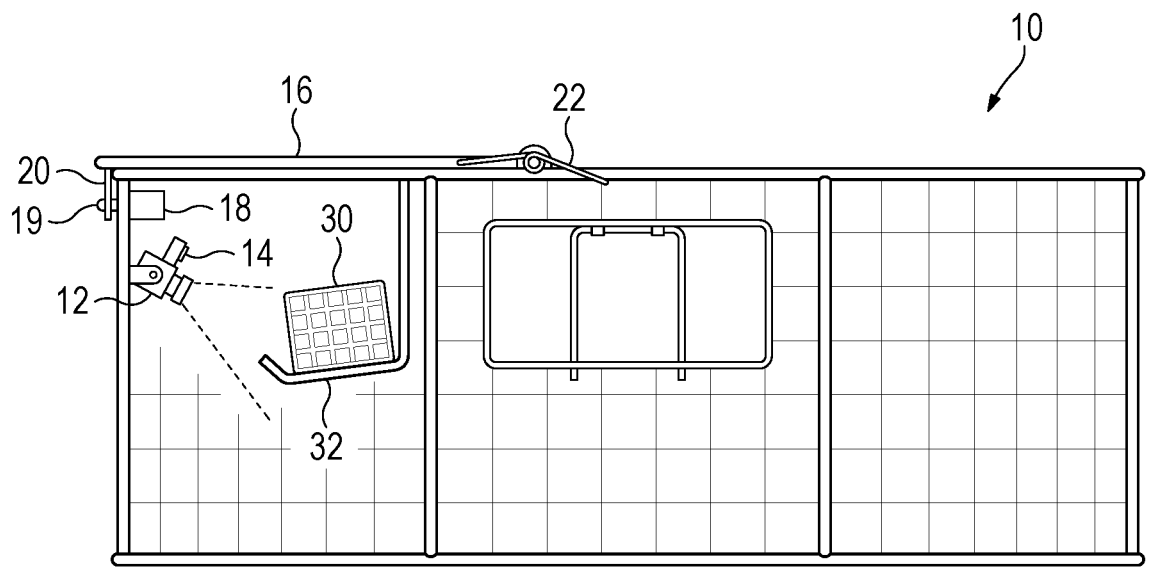
FIG. 1 is a side view of a marine life trap having a bait box, according to a preferred embodiment of the present invention.
Figure 2:
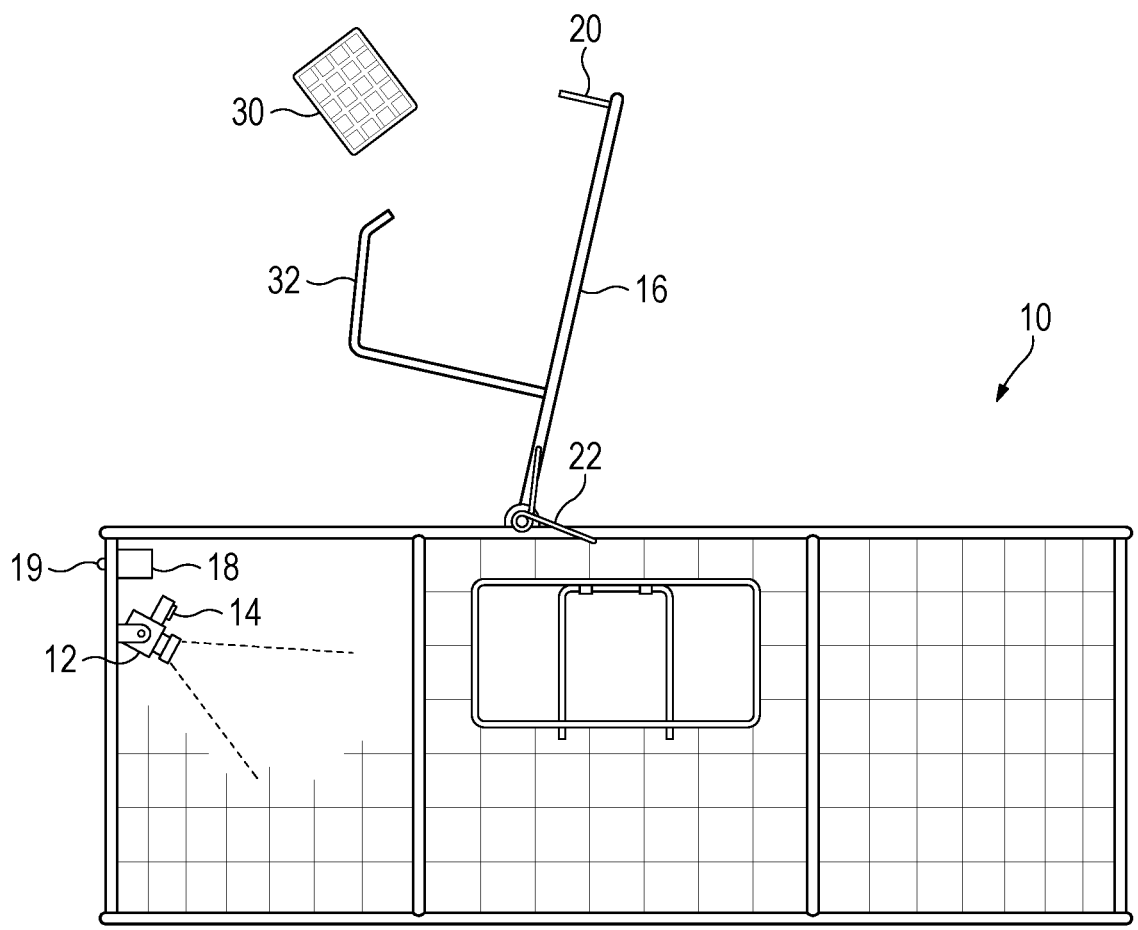
FIG. 2 is a side view of the marine life trap of claim 1, in the process of ejecting the bait box.

Referring to FIGS. 1 and 2 In a preferred embodiment, a trap 10, includes a camera 12, and a light flash mechanism 14 that is tuned to have a maximum reflectance from a particular species of protected crabs, for example Blue King Crabs. Accordingly, when a trap contains a Blue King Crab, this crab will appear brightly illuminated and therefore clearly distinguishable from any other crab. When this is found, the person examining the images may send a signal, by reverse course, to the buoy which will relay it to the trap, to open the trap door 16. (All crab traps or pots are currently equipped with doors, which can be opened to remove the caught crabs). In this embodiment, the door latch is remotely operable to permit the door to swing open. In a preferred embodiment, a solenoid 18 causes a pin 19 to be withdrawn from a door hasp 20, and the door is urged by a spring 22, to swing open when unopposed. In a further embodiment, a bait cage 30 inside the trap is equipped with a similar latched spring mechanism (not shown), or held by a holder 32, that is part of door 16 whereby when the pin 19 is withdrawn, any bait remaining in the bait cage is ejected from the trap 10, by action of the spring 22 acting on door 16. In one preferred embodiment, in which the bait cage 30 is not supported by a part of the door 16, the spring action is amplified by way of a lever arm, to form a bait catapult. By ejecting the bait, any protected species of crabs are thereby encouraged to leave the trap, so that it can be the more readily retrieved.

There are some species of protected crabs which may be brought to the surface and released. In the decision of where to lay down more traps, areas with high concentrations of these crabs may be avoided, because catching them creates a greater crab sorting burden.

Although the above process has been described with respect to crabs, it may also be used for the harvesting of other valuable crustaceans, for example lobsters. When used for lobsters, the grid distances given above may be adjusted to better fit known models of lobster harvesting.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of harvesting crustaceans in an area where there is a protected crustacean species, comprising:
   a. provide a trap being equipped with a digital camera and a light flash mechanism that is tuned to return a maximum signal from crustaceans of said protected crustacean species so that a protected species crustacean appears as brightly lit in images returned, and being communicatively connected to a further location that is equipped to receive images from said digital camera and to display said image to a human user and wherein said trap is equipped with a door that can be remotely opened by a first signal originating at said further location and further includes a bait holder, and wherein said bait holder is provided with an eject mechanism that is responsive to a second signal originating at said further location, to eject the bait;
   b. laying out said trap in the ocean;
   c. for said trap, repeatedly lighting said trap with said flash mechanism and forming an image with said digital camera and sending said image to said further location;
   d. monitoring said images;
   e. in reliance on said images when a crustacean of said protected crustacean species is detected in said trap, sending a first and second signal to said first trap so that said door is opened, thereby permitting said crustacean to leave said trap, and ejecting said bait, to further encourage said crustacean to leave.

2. The method of claim 1, wherein said crustaceans are crabs.

3. The method of claim 1, wherein said second signal is the same as said first signal, so that when said first signal is sent, said door opens and said bait is ejected.

4. The method of claim 1 wherein said flash mechanism is tuned to Blue King Crabs.

* * * * *